US012789742B2

(12) United States Patent
(10) Patent No.: US 12,789,742 B2
(45) Date of Patent: Nov. 10, 2026

Hwangbo et al.

(54) AIRBAG APPARATUS

(71) Applicant: HYUNDAI MOBIS CO., LTD., Seoul (KR)

(72) Inventors: Sang Won Hwangbo, Yongin-si (KR); Dong Gil Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 19/362,920

(22) Filed: Oct. 20, 2025

(65) Prior Publication Data

US 2026/0116330 A1 Apr. 30, 2026

(30) Foreign Application Priority Data

Oct. 29, 2024 (KR) ........................ 10-2024-0150110

(51) Int. Cl.

*B60R 21/231* (2011.01)
*B60R 21/207* (2006.01)
*B60R 21/217* (2011.01)
*B60R 21/2338* (2011.01)
*B60R 21/237* (2006.01)

(52) U.S. Cl.

CPC ...... *B60R 21/23138* (2013.01); *B60R 21/207* (2013.01); *B60R 21/217* (2013.01); *B60R 21/2338* (2013.01); *B60R 21/237* (2013.01); *B60R 2021/23107* (2013.01); *B60R 2021/23146* (2013.01); *B60R 2021/23382* (2013.01)

(58) Field of Classification Search

CPC .................................................... B60R 21/207
See application file for complete search history.

(56) References Cited

U.S. PATENT DOCUMENTS

| | | | | |
|---|---|---|---|---|
| 7,549,672 | B2 * | 6/2009 | Sato | B60R 21/2338 280/730.2 |
| 9,862,347 | B2 * | 1/2018 | Deng | B60R 21/205 |
| 9,994,181 | B1 * | 6/2018 | Dubaisi | B60R 21/207 |
| 10,336,283 | B2 * | 7/2019 | Rickenbach | B60R 21/233 |
| 10,850,699 | B2 * | 12/2020 | Dry | B60R 21/207 |

(Continued)

FOREIGN PATENT DOCUMENTS

| | | | | |
|---|---|---|---|---|
| CN | 113071445 A * | 7/2021 | ....... | B60R 21/23138 |
| DE | 102020118337 A1 * | 1/2022 | ........... | B60R 21/233 |

(Continued)

*Primary Examiner* — Nicole T Verley

(74) *Attorney, Agent, or Firm* — NovoTechIP International PLLC

(57) ABSTRACT

An airbag apparatus include: a first chamber including a first side cushion connected to a first side of a seatback and configured to be deployed forward, a first bending portion configured to bend the first side cushion such that the first side cushion curves to surround a first side of a seated occupant, and a first front cushion configured to be deployed from the first side cushion to face a front surface of the seated occupant; and a second chamber including a second side cushion connected to a second side of the seatback and configured to be deployed forward, a second bending portion configured to bend the second side cushion such that the second side cushion curves to surround a second side of the seated occupant, and a second front cushion configured to be deployed from the second side cushion to overlap the first front cushion.

15 Claims, 8 Drawing Sheets

(56) References Cited

U.S. PATENT DOCUMENTS

| | | | | |
|---|---|---|---|---|
| 10,953,836 | B2 * | 3/2021 | Wold | B60R 21/233 |
| 11,124,146 | B2 * | 9/2021 | Saso | B60R 21/232 |
| 11,186,246 | B2 * | 11/2021 | Min | B60R 21/23138 |
| 11,377,062 | B2 * | 7/2022 | Kwon | B60R 21/231 |
| 11,390,235 | B2 * | 7/2022 | Kim | B60R 21/207 |
| 11,820,311 | B2 * | 11/2023 | Hwangbo | B60R 21/2346 |
| 12,296,775 | B2 * | 5/2025 | Hwangbo | B60R 21/207 |
| 2019/0283700 | A1 * | 9/2019 | Kwon | B60R 21/2338 |
| 2020/0101921 | A1 * | 4/2020 | Nagasawa | B60R 21/231 |
| 2020/0223387 | A1 * | 7/2020 | Min | B60R 21/23138 |
| 2020/0290552 | A1 * | 9/2020 | Saso | B60R 21/21 |
| 2021/0094499 | A1 * | 4/2021 | Deng | B60R 21/261 |
| 2021/0354654 | A1 * | 11/2021 | Lee | B60R 21/237 |
| 2022/0203921 | A1 * | 6/2022 | Kawamura | B60R 21/2338 |
| 2023/0166682 | A1 * | 6/2023 | Sung | B60R 21/239<br>280/729 |

FOREIGN PATENT DOCUMENTS

| | | | | |
|---|---|---|---|---|
| DE | 102020118339 | A1 * | 1/2022 | B60R 21/233 |
| JP | 6691569 | B2 * | 4/2020 | B60R 21/2338 |
| JP | 6757382 | B2 * | 9/2020 | B60R 21/2334 |
| JP | 6825516 | B2 * | 2/2021 | |
| KR | 10-2019-0028588 | A | 8/2022 | |
| KR | 20230036577 | A * | 3/2023 | B60R 21/2338 |
| KR | 102647195 | B1 * | 3/2024 | B60R 21/207 |
| KR | 102661047 | B1 * | 4/2024 | B60R 21/23138 |
| KR | 20240139417 | A * | 9/2024 | B60R 21/231 |
| KR | 102833216 | B1 * | 7/2025 | B60R 21/233 |

* cited by examiner

AIRBAG APPARATUS

CROSS-REFERENCE TO RELATED APPLICATIONS

This application claims priority from and the benefit of Korean Patent Application No. 10-2024-0150110, filed on Oct. 29, 2024, which is hereby incorporated by reference for all purposes as if set forth herein.

TECHNICAL FIELD

Various embodiments of the present disclosure relate to an airbag apparatus, and more particularly, to a surround airbag apparatus that is deployed to surround a seated occupant in the event of a collision accident.

BACKGROUND

As autonomous driving technology advances, installation positions and orientations of seats in a passenger compartment are becoming diversified. Accordingly, a so-called surround airbag, which is installed in a seat and deploys a cushion to surround a seated occupant in the event of a vehicle collision accident so as to protect the seated occupant on the seat regardless of the installation position or orientation of the seat, is required.

The background art of the present disclosure is disclosed in Korean Patent Laid-open Publication No. 10-2019-0028588 (published on Mar. 19, 2019, entitled "AIRBAG APPARATUS FOR VEHICLES").

SUMMARY

Various embodiments are directed to an airbag apparatus in which a pair of chambers protrude from opposite side surfaces of a seatback to surround a seated occupant, and front cushions of the pair of chambers reliably overlap each other and are coupled to each other.

An airbag apparatus according to the present disclosure may include: a first chamber including a first side cushion connected to a first side of a seatback of a seat of a vehicle, the first side cushion being configured to be deployed forward, a first bending portion configured to bend the first side cushion such that the first side cushion curves in a direction to surround a first side of a seated occupant on the seat, and a first front cushion configured to be deployed from the first side cushion so that the first front cushion faces a front of the seated occupant; and a second chamber including a second side cushion connected to a second side of the seatback and configured to be deployed forward, a second bending portion configured to bend the second side cushion such that the second side cushion curves in a direction to surround a second side of the seated occupant, and a second front cushion configured to be deployed from the second side cushion so that the second front cushion overlaps the first front cushion.

The first bending portion may be positioned between a front end and a rear end of the first side cushion. The second bending portion may be positioned between a front end and a rear end of the second side cushion.

The first side cushion may include a first outer panel, and a first inner panel that overlaps the first outer panel and forms an internal space of the first side cushion together with the first outer panel. The first bending portion may include a first folded portion formed by folding the first inner panel such that portions of the first inner panel partially overlap.

The second side cushion may include a second outer panel, and a second inner panel that overlaps the second outer panel and forms an internal space of the second side cushion together with the second outer panel. The second bending portion may include a second folded portion formed by folding the second inner panel such that portions of the second inner panel partially overlap.

The first bending portion may further include a first through-hole formed to pass through the first inner panel. The first folded portion may be formed by folding the first inner panel such that the first through-hole is closed, and sewing portions of the first inner panel that face each other by the folding.

The second bending portion may further include a second through-hole formed to pass through the second inner panel. The second folded portion may be formed by folding the second inner panel such that the second through-hole is closed, and sewing portions of the second inner panel that face each other by the folding.

The first through-hole and the second through-hole may each have an elliptical planar shape.

The first bending portion may further include a first front bending reinforcement tether located in front of the first folded portion, and including an inner end coupled to the first inner panel by sewing, and an outer end coupled to the first outer panel by sewing, and a first rear bending reinforcement tether located behind the first folded portion, and including an inner end coupled to the first inner panel by sewing, and an outer end coupled to the first outer panel by sewing.

A distance between the outer end of the first front bending reinforcement tether and the outer end of the first rear bending reinforcement tether may be greater than a distance between the inner end of the first front bending reinforcement tether and the inner end of the first rear bending reinforcement tether.

The second bending portion may further include a second front bending reinforcement tether located in front of the second folded portion, and including an inner end coupled to the second inner panel by sewing, and an outer end coupled to the second outer panel by sewing, and a second rear bending reinforcement tether located behind the second folded portion, and including an inner end coupled to the second inner panel by sewing, and an outer end coupled to the second outer panel by sewing.

A distance between the outer end of the second front bending reinforcement tether and the outer end of the second rear bending reinforcement tether may be greater than a distance between the inner end of the second front bending reinforcement tether and the inner end of the second rear bending reinforcement tether.

The airbag apparatus may further include a front cushion coupling portion configured to detachably couple the first front cushion and the second front cushion when the first front cushion and the second front cushion overlap each other.

The front cushion coupling portion may include a female Velcro tape provided on either the first front cushion or the second front cushion, and a male Velcro tape provided on a remaining one of the first front cushion and the second front cushion, and configured to face the female Velcro tape.

The airbag apparatus may further include: a first inflator positioned in the first side cushion, and configured to provide gas that deploys the first chamber; and a second inflator positioned in the second side cushion, and configured to provide gas that deploys the second chamber.

The airbag apparatus may further include a first side tether including a first end coupled to the first side of the seatback, and a second end coupled to the first side cushion.

The airbag apparatus may further include a second side tether including a first end coupled to the second side of the seatback, and a second end coupled to the second side cushion.

The airbag apparatus may further include: a first inflator positioned in the first side cushion, and configured to provide gas that deploys the first chamber; a first inflator fixing stud connecting the seatback and the first inflator such that the first inflator is supported on the first side of the seatback; a second inflator positioned in the second side cushion, and configured to provide gas that deploys the second chamber; and a second inflator fixing stud connecting the seatback and the second inflator such that the second inflator is supported on the second side of the seatback. The first end of the first side tether may be coupled to the first inflator fixing stud. The first end of the second side tether may be coupled to the second inflator fixing stud.

The first chamber may include at least one first side cushion internal tether provided in the first side cushion and configured to limit a thickness of the first side cushion. The second chamber may include at least one second side cushion internal tether provided in the second side cushion and configured to limit a thickness of the second side cushion.

The first chamber may include at least one first front cushion internal tether provided in the first front cushion and configured to limit a thickness of the first front cushion. The second chamber may include at least one second front cushion internal tether provided in the second front cushion and configured to limit a thickness of the second front cushion.

According to the present disclosure, a first side cushion and a second side cushion may be deployed and bent, such that the first side cushion and the second side cushion do not spread apart, and the first front cushion and the second front cushion may be reliably coupled by overlapping each other. Accordingly, in the event of a vehicle collision, a seated occupant on a seat may be safely restrained, thereby preventing the seated occupant from being seriously injured.

In addition, even in the case of a seated occupant having a relatively large distance between the shoulders, because the first front cushion and the second front cushion may be overlapped and be coupled with each other, serious injury to the seated occupant may be prevented in the event of a vehicle collision.

DETAILED DESCRIPTION

Hereinafter, an airbag apparatus according to an embodiment of the present disclosure will be described in detail with reference to the accompanying drawings. The terminology used herein is for the purpose of describing particular embodiments and may vary according to the intention of users or operators or conventional custom in the art. Accordingly, definition of the terminology should be made according to the overall disclosure set forth herein.

Figure 1:
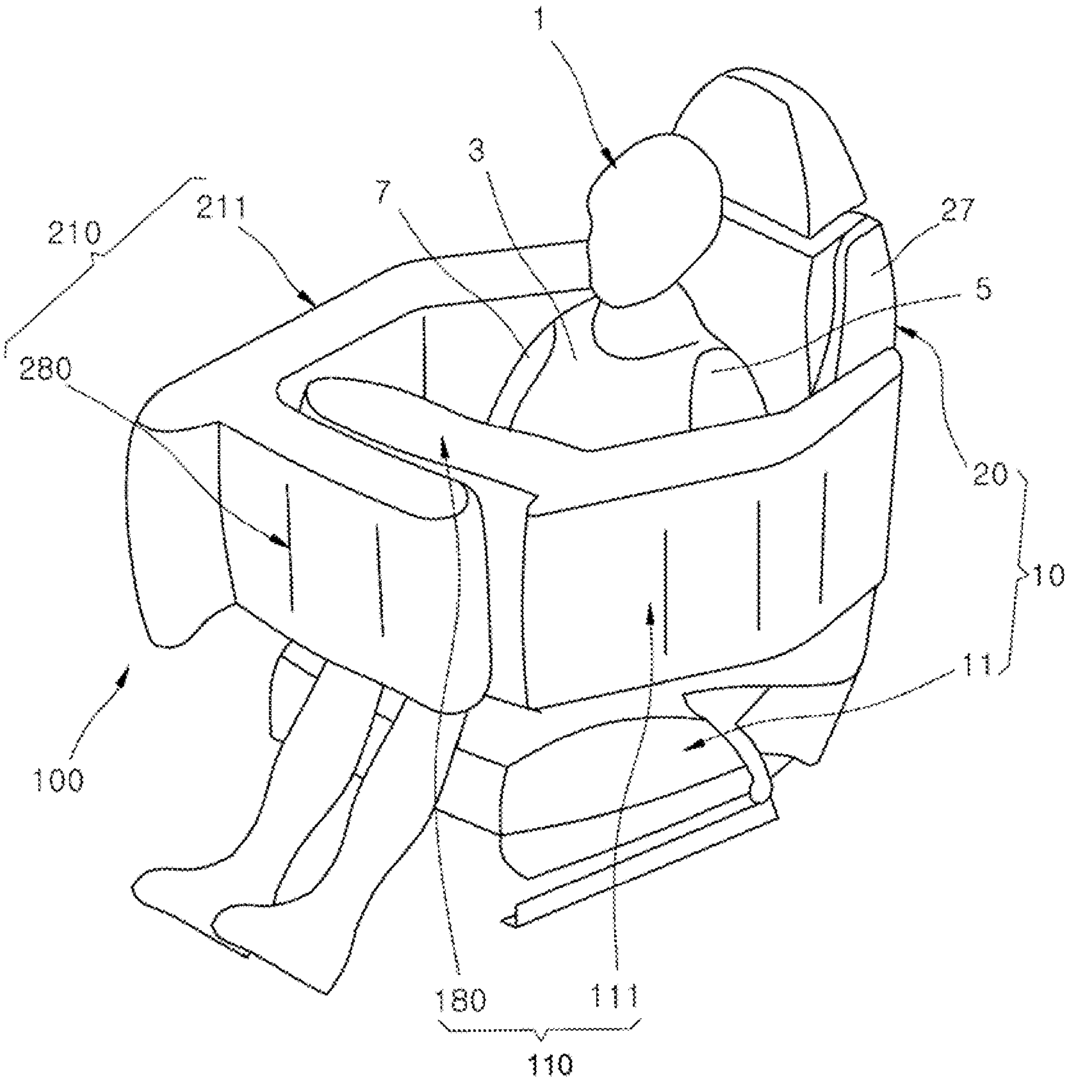
FIG. 1 is a perspective view illustrating a state in which an airbag apparatus according to an embodiment of the present disclosure is deployed to surround a seated occupant.
Figure 2:
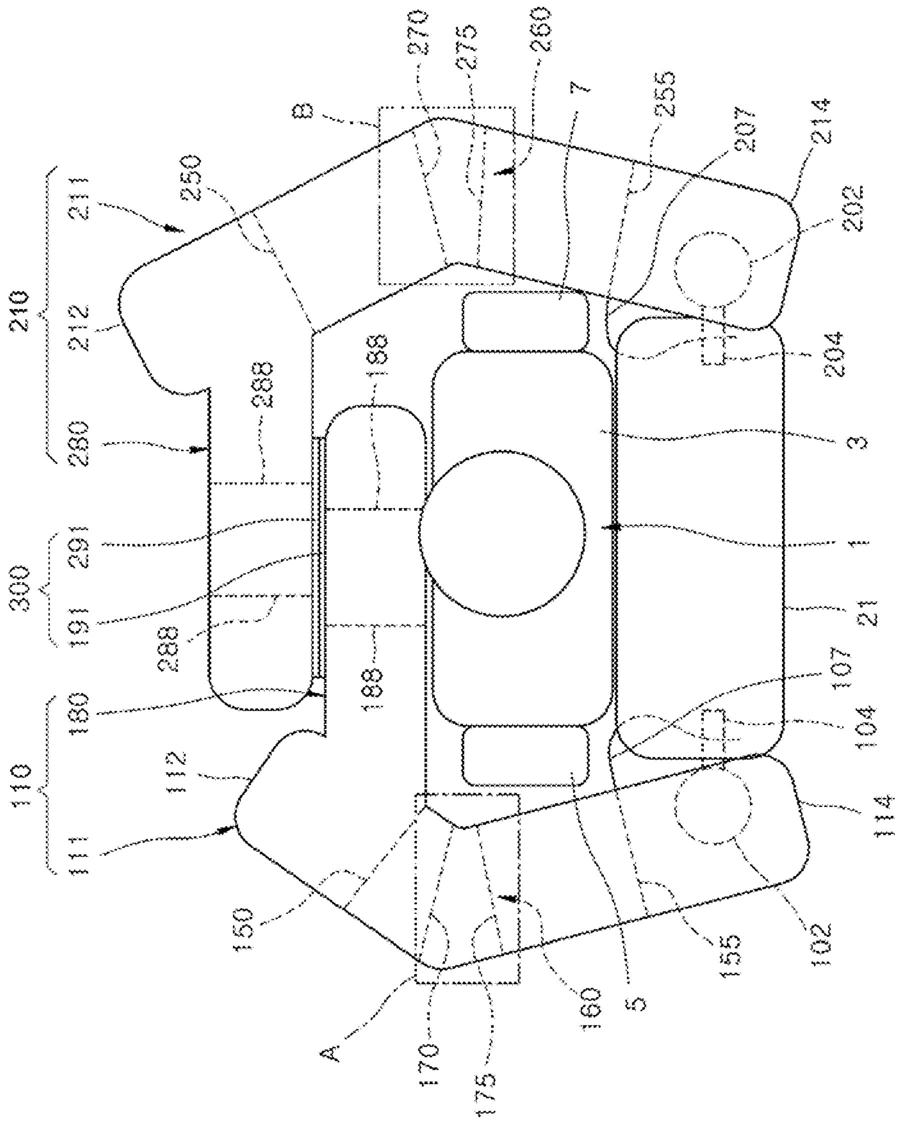
FIG. 2 is a plan view illustrating a state in which the airbag apparatus according to an embodiment of the present disclosure is deployed to surround the seated occupant.
Figure 3:
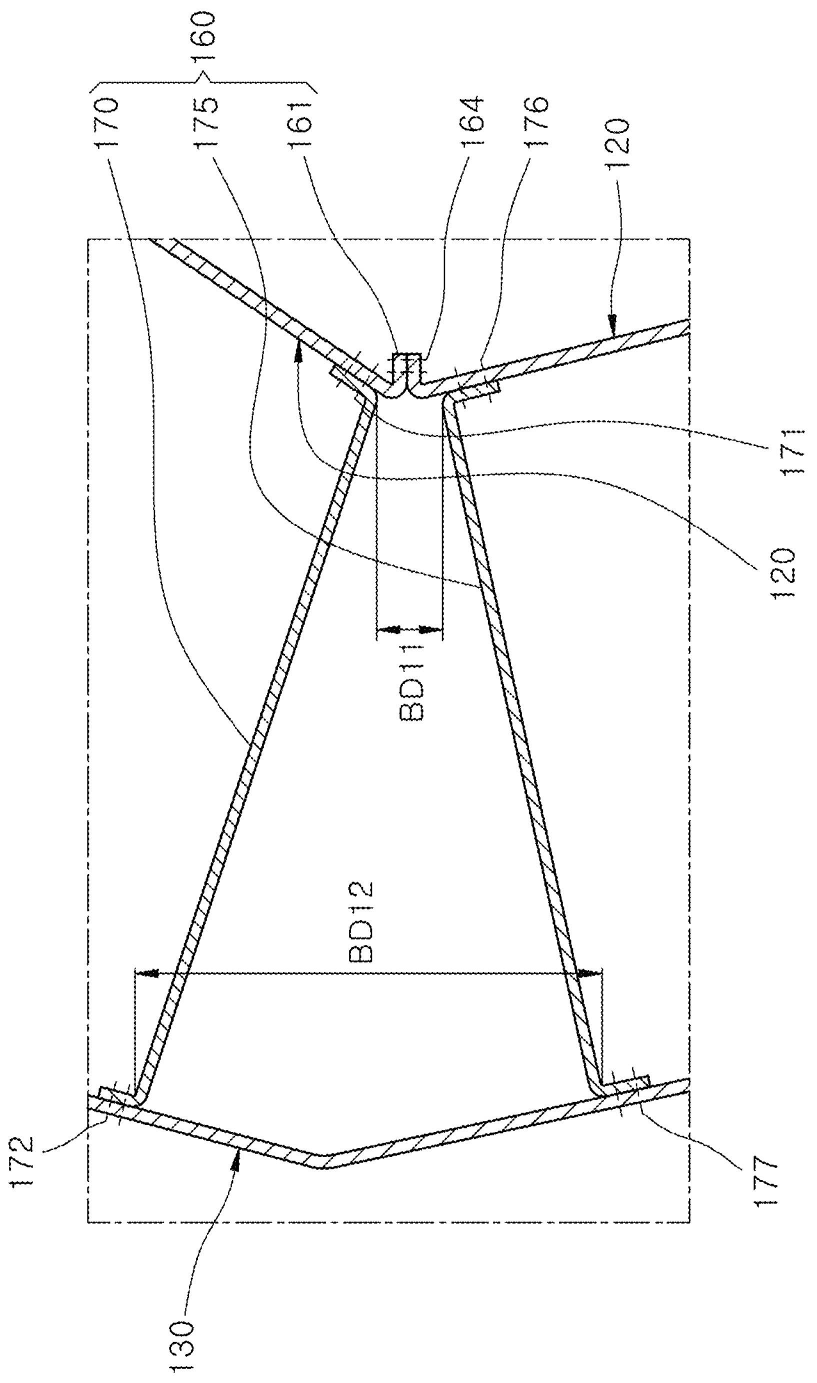
FIG. 3 is a cross-sectional view showing an enlarged interior of portion A in FIG. 2.
Figure 4:
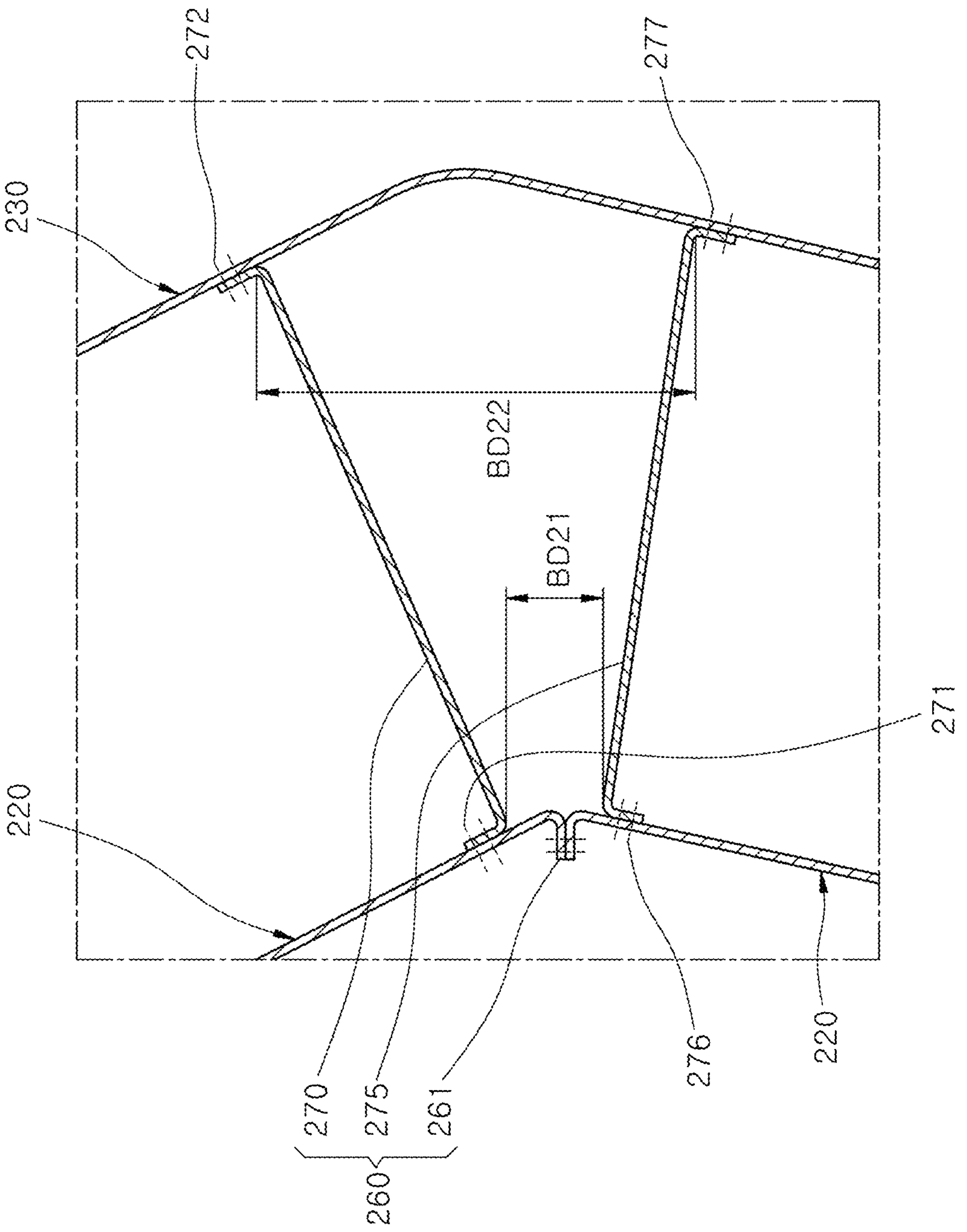
FIG. 4 is a cross-sectional view showing an enlarged interior of portion B in FIG. 2.
Figure 5:
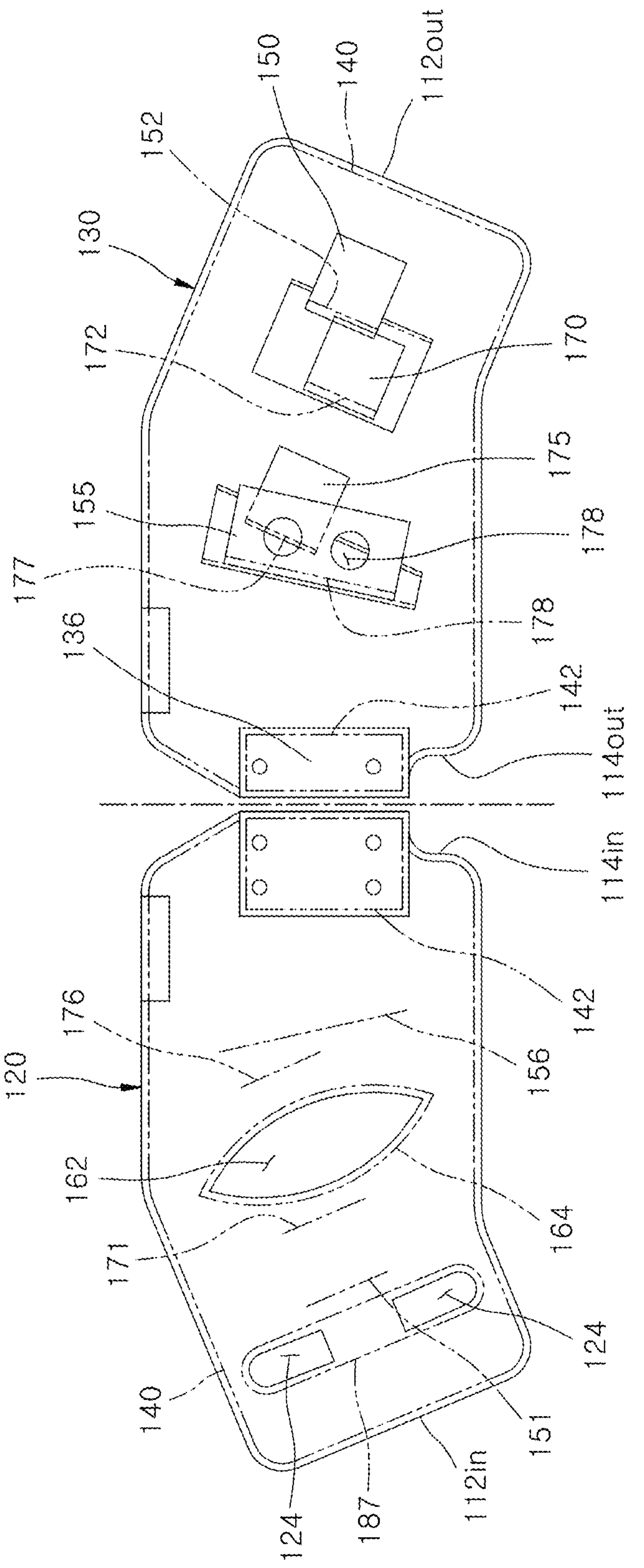
FIG. 5 is a developed view illustrating an example in which a first inner panel and a first outer panel included in a first side cushion of FIG. 2 are unfolded.
Figure 6:
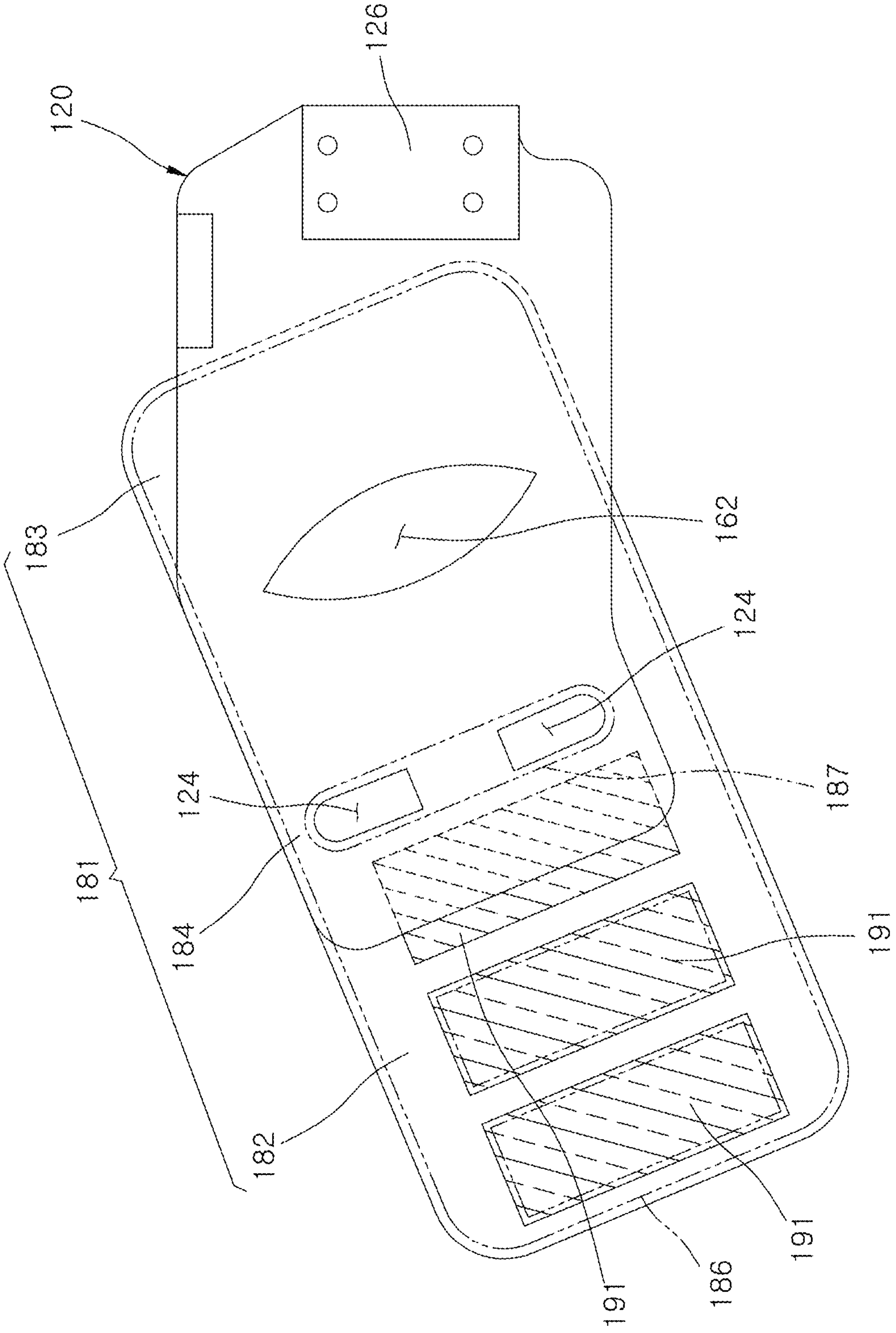
FIG. 6 is a developed view illustrating an unfolded state of a combination of a first front cushion panel included in a first front cushion of FIG. 2 and the first inner panel of FIG. 5.
Figure 7:
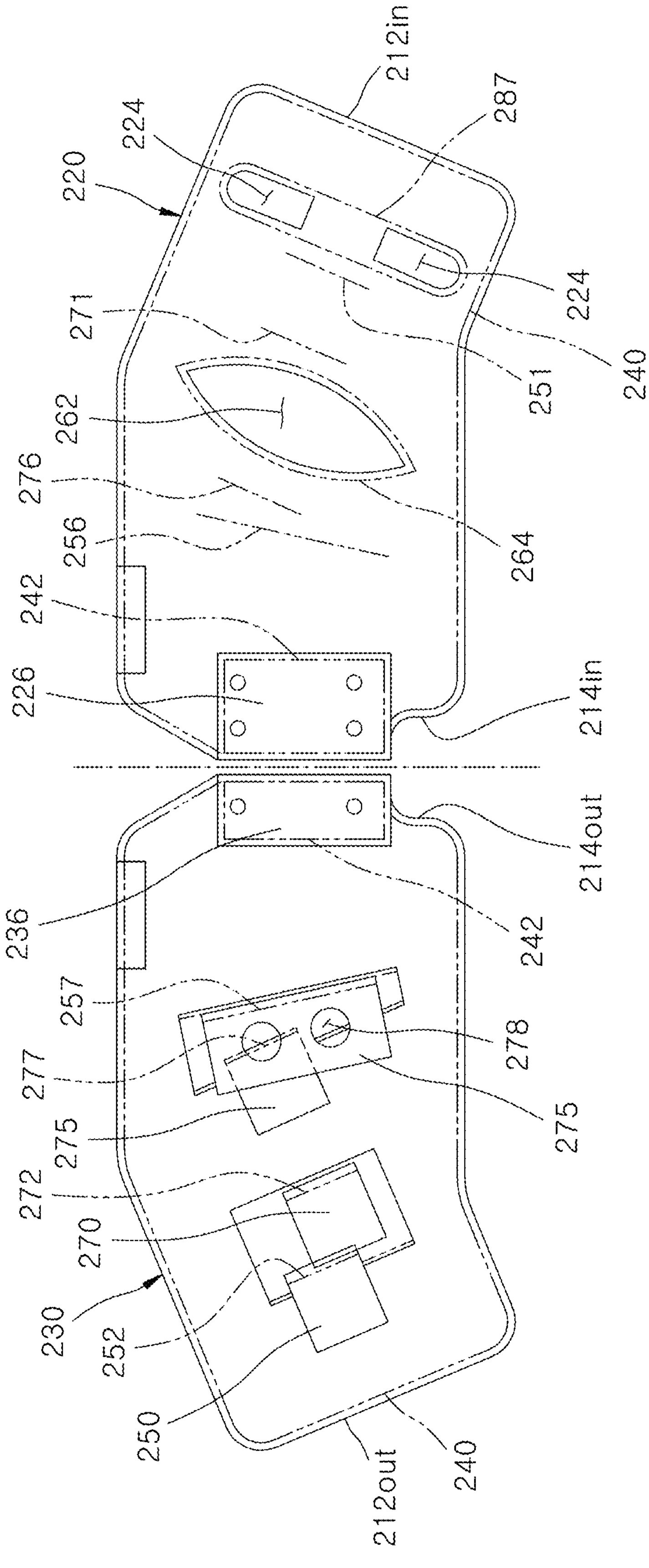
FIG. 7 is a developed view illustrating an example in which a second inner panel and a second outer panel included in a second side cushion of FIG. 2 are unfolded.
Figure 8:
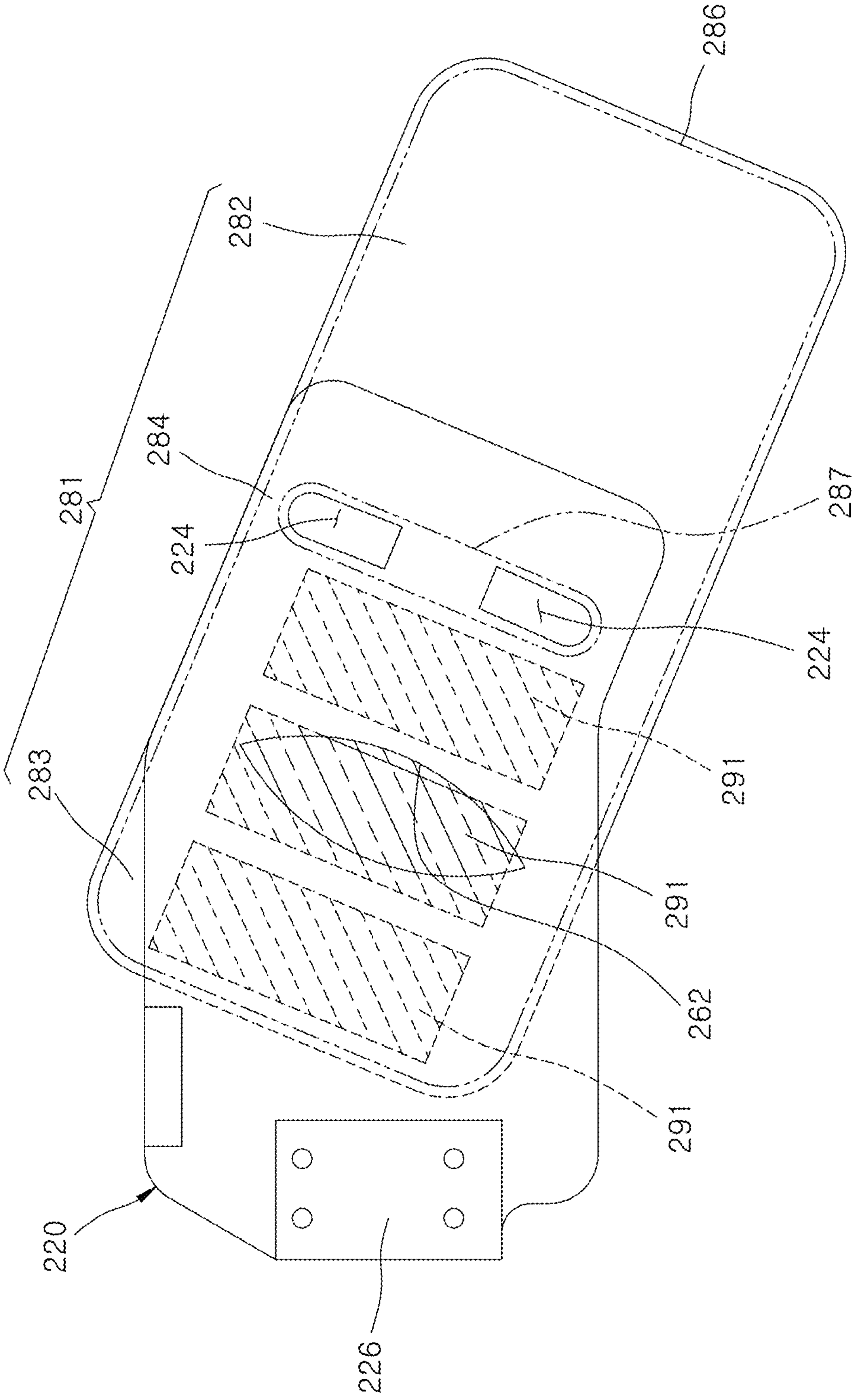
FIG. 8 is a developed view illustrating an unfolded state of a combination of the first front cushion panel included in the first front cushion of FIG. 2 and the second inner panel of FIG. 7.

FIG. 1 is a perspective view illustrating a state in which an airbag apparatus according to an embodiment of the present disclosure is deployed to surround a seated occupant. FIG. 2 is a plan view illustrating a state in which the airbag apparatus according to an embodiment of the present disclosure is deployed to surround the seated occupant. FIG. 3 is a cross-sectional view showing an enlarged interior of portion A in FIG. 2. FIG. 4 is a cross-sectional view showing an enlarged interior of portion B in FIG. 2. FIG. 5 is a developed view illustrating an example in which a first inner panel and a first outer panel included in a first side cushion in FIG. 2 are unfolded. FIG. 6 is a developed view illustrating an unfolded state of a combination of a first front cushion panel included in a first front cushion of FIG. 2 and the first inner panel of FIG. 5. FIG. 7 is a developed view illustrating an example in which a second inner panel and a second outer panel included in a second side cushion in FIG. 2 are unfolded. FIG. 8 is a developed view illustrating an unfolded state of a combination of the first front cushion panel included in the first front cushion of FIG. 2 and the second inner panel of FIG. 7.

Referring to FIGS. 1 and 2, an airbag apparatus 100 according to an embodiment of the present disclosure may include a first chamber 110 and a second chamber 210. The airbag apparatus 100 may be a so-called surround airbag apparatus in which the first chamber 110 and the second chamber 210 are deployed to surround a seated occupant 1 on a seat 10 of a vehicle in the event of a vehicle collision accident. For example, the first chamber 110 and the second chamber 210 may be deployed to surround an upper body 3 of the seated occupant 1.

The first chamber 110 may include a first side cushion 111 and a first front cushion 180. The second chamber 210 may include a second side cushion 211 and a second front cushion 280. The seat 10 of the vehicle may include a seat stool 11 that supports the buttocks of the seated occupant 1, and a seatback 20 that supports the back of the seated occupant 1.

The first side cushion 111 may be connected to a first side of the seatback 20, and may be deployed forward. For example, the first side of the seatback 20 may be a left side of the seatback 20.

A first bending portion 160 may bend the first side cushion 111 such that the first side cushion 111 curves in a direction to surround a first side of the seated occupant 1 on the seat 10. For example, the first bending portion 160 may bend the first side cushion 111 such that the first side cushion 111 curves in a direction to surround a left shoulder 5 of the seated occupant 1.

The first front cushion 180 may be deployed from the first side cushion 111 to face a front surface of the seated occupant 1.

The second side cushion 211 may be connected to a second side of the seatback 20, and may be deployed forward. For example, the second side of the seatback 20 may be a right side of the seatback 20.

The second bending portion 260 may bend the second side cushion 211 such that the second side cushion 211 curves in a direction to surround a second side of the seated occupant 1 on the seat 10. For example, the second bending portion 260 may bend the second side cushion 211 such that the second side cushion 211 curves in a direction to surround a right shoulder 7 of the seated occupant 1.

The second front cushion 280 may be deployed from the second side cushion 211 to overlap the first front cushion 180. For example, the second front cushion 280 may be deployed to be positioned in front of the first front cushion 180.

The airbag apparatus 100 may further include a first inflator 102, a second inflator 202, a first inflator fixing stud 104, a second inflator fixing stud 204, a first side tether 107, and a second side tether 207.

The first inflator 102 may be positioned in the first side cushion 111. The first inflator 102 may provide gas to deploy the first chamber 110. The first inflator 102 may be located closer to a rear end 114 than to a front end 112 of the first side cushion 111.

The second inflator 202 may be positioned in the second side cushion 211. The second inflator 202 may provide gas to deploy the second chamber 210. The second inflator 202 may be located closer to a rear end 214 than to a front end 212 of the second side cushion 211.

The first inflator fixing stud 104 may connect the seatback 20 and the first inflator 102 such that the first inflator 102 is supported on the first side of the seatback 20. The second inflator fixing stud 204 may connect the seatback 20 and the second inflator 202 such that the second inflator 202 is supported on the second side of the seatback 20.

The seatback 20 may include a seatback frame 21 and a seatback cover 27 that encloses the seatback frame 21 so that the seatback frame 21 is not exposed. The seatback cover 27 may be formed of, for example, fabric or leather. The first inflator fixing stud 104 may connect the first inflator 102 and a first side of the seatback frame 21. The second inflator fixing stud 204 may connect the second inflator 202 and a second side of the seatback frame 21.

The undeployed first chamber 110 and the first inflator 102 may be located in a space between an inner side of a first side of the seatback cover 27 and an outer side of the first side of the seatback frame 21. The undeployed second chamber 210 and the second inflator 202 may be located in a space between an inner side of a second side of the seatback cover 27 and an outer side of the second side of the seatback frame 21.

The first chamber 110 that is deployed by gas supplied from the first inflator 102 may partially tear the first side of the seatback cover 27 and protrude outward from the first side of the seatback 20. The second chamber 210 that is deployed by gas supplied from the second inflator 202 may partially tear the second side of the seatback cover 27 and protrude outward from the second side of the seatback 20.

When the first side cushion 111 and the second side cushion 211 are deployed, the first side tether 107 may pull the first side cushion 111 by an elastic force, and the second side tether 207 may pull the second side cushion 211 by an elastic force so that the first side cushion 111 and the second side cushion 211 can be prevented from excessively moving away from each other.

The first side tether 107 includes a first end coupled to the first side of the seatback 20, and a second end coupled to the first side cushion 111. The second side tether 207 includes a first end coupled to the second side of the seatback 20, and a second end coupled to the second side cushion 211.

The first end of the first side tether 107 may be coupled to the first inflator fixing stud 104. The first end of the second side tether 207 may be coupled to the second inflator fixing stud 204.

Referring to FIGS. 1 to 3, 5, and 6, the first side cushion 111 may include a first outer panel 130, and a first inner panel 120 that overlaps the first outer panel 130 to form an internal space of the first side cushion 111 together with the first outer panel 130. The first side cushion 111 may be formed by overlapping the first inner panel 120 and the first outer panel 130 and sewing outer peripheral portions thereof along an outer sewing line 140.

The rear end 114 of the first side cushion 111 may be formed by overlapping and sewing a rear end 114 in of the first inner panel 120 and a rear end 114out of the first outer panel 130. The front end 112 of the first side cushion 111 may be formed by overlapping and sewing a front end 112 in of the first inner panel 120 and a front end 112out of the first outer panel 130.

In order to prevent the first side cushion 111 from being damaged by heat and pressure of gas discharged when the first inflator 102 explodes due to a vehicle collision accident, an inflator mounting panel 126 may be attached to the rear end 114 in of the first inner panel 120, and an inflator mounting panel 136 may be attached to the rear end 114out of the first outer panel 130. The rear end 114 in of the first inner panel 120, the rear end 114out of the first outer panel 130, and the inflator mounting panels 126 and 136 may be sewn along a sewing line 142, and the first inflator 102 may be installed in the sewn portion.

The first chamber 110 may include a pair of first side cushion internal tethers 150 and 155 disposed at (or provided in) the first side cushion 111 to limit a thickness of the first side cushion 111. The pair of first side cushion internal tethers 150 and 155 may include a front internal tether 150 and a rear internal tether 155 that is positioned to be spaced apart rearward from the front internal tether 150.

One end of the front internal tether 150 may be sewn along a sewing line 151 and coupled to the first inner panel 120. A remaining end of the front internal tether 150 may be sewn along a sewing line 152 and coupled to the first outer panel 130.

One end of the rear internal tether 155 may be sewn along a sewing line 156 and coupled to the first inner panel 120. A remaining end of the rear internal tether 155 may be sewn along a sewing line 157 and coupled to the first outer panel 130. A tether through-hole 178 that allows smooth flow of gas when the first side cushion 111 is deployed may be formed in the rear internal tether 155. Unlike the embodiment illustrated in FIGS. 2 and 5, an airbag apparatus according to another embodiment of the present disclosure may include a single internal tether or three or more internal tethers in the first side cushion.

The first bending portion 160 may include a first folded portion 161, a first through-hole 162, a first front bending reinforcement tether 170, and a first rear bending reinforcement tether 175. The first bending portion 160 may be located between the front end 112 and the rear end 114 of the first side cushion 111.

The first folded portion 161 is a portion where the first inner panel 120 is folded such that portions of the first inner panel 120 partially overlap each other. The first through-hole 162 may be formed to pass through the first inner panel 120. A planar shape of the first through-hole 162 may include, for example, a rugby ball shape in plan view or an elliptical shape, as illustrated in FIG. 5.

The first folded portion 161 may be formed by folding the first inner panel 120 such that the first through-hole 162 is closed, and sewing, along a sewing line 164, portions of the first inner panel 120 that face each other by the folding. As illustrated in FIG. 5, the sewing line 164 may be spaced apart from an inner peripheral edge of the first through-hole 162 at a constant interval and may extend along a closed-loop path.

Because a length of the first inner panel 120 becomes substantially shorter than a length of the first outer panel 130 due to the first folded portion 161, the first side cushion 111 may be bent at the first bending portion 160 toward a central portion between a left end and a right end of the seatback 20.

The first front bending reinforcement tether 170 may be located in front of the first folded portion 161, and the first rear bending reinforcement tether 175 may be located behind the first folded portion 161. The first front bending reinforcement tether 170 may include an inner end sewn and coupled to the first inner panel 120 along a sewing line 171, and an outer end sewn and coupled to the first outer panel 130 along a sewing line 172.

The first rear bending reinforcement tether 175 may include an inner end sewn and coupled to the first inner panel 120 along a sewing line 176, and an outer end sewn and coupled to the first outer panel 130 along a sewing line 177.

In a deployed state of the first chamber 110, a distance BD12 between the outer end of the first front bending reinforcement tether 170 and the outer end of the first rear bending reinforcement tether 175 may be greater than a distance BD11 between the inner end of the first front bending reinforcement tether 170 and the inner end of the first rear bending reinforcement tether 175.

The first front cushion 180 may include a first front cushion panel 181. The first front cushion panel 181 may include an outer sheet 182, an inner sheet 183, and an inner panel coupling portion 184 between the outer sheet 182 and the inner sheet 183.

The first front cushion panel 181 may be folded such that the outer sheet 182 and the inner sheet 183 face each other around the inner panel coupling portion 184, and thereafter, an outer peripheral portion of the first front cushion panel 181 may be sewn along an outer sewing line 186, thereby forming the first front cushion 180 that defines an internal space.

In order to allow gas supplied from the first inflator 102 to flow from the internal space of the first side cushion 111 into the internal space of the first front cushion 180, a front cushion connection through-hole 124 is formed in the front end 112 in of the first inner panel 120, and a side cushion connection through-hole corresponding to the front cushion connection through-hole 124 is formed in the inner panel coupling portion 184.

The inner panel coupling portion 184 may be coupled to the first inner panel 120 by sewing around the front cushion connection through-hole 124 and the side cushion connection through-hole along a sewing line 187.

The first chamber 110 may include a pair of first front cushion internal tethers 188 in the first front cushion 180 to limit a thickness of the first front cushion 180. In the same manner as the first side cushion internal tethers 150 and 155, each of the pair of first front cushion internal tethers 188 may have one end and a remaining end that are respectively coupled to the outer sheet 182 and the inner sheet 183 by sewing.

The pair of first front cushion internal tethers 188 may be spaced apart from each other in a longitudinal direction of the first front cushion 180. Unlike the embodiment illustrated in FIG. 2, an airbag apparatus according to another embodiment of the present disclosure may include a single internal tether or three or more internal tethers in the first front cushion.

Referring to FIGS. 1, 2, 4, 7, and 8, the second side cushion 211 may include a second outer panel 230, and a second inner panel 220 that overlaps the second outer panel 230 to form an internal space of the second side cushion 211 together with the second outer panel 230. The second side cushion 211 may be formed by overlapping the second inner panel 220 and the second outer panel 230 and sewing outer peripheral portions thereof along an outer sewing line 240.

The rear end 214 of the second side cushion 211 may be formed by overlapping and sewing a rear end 214 in of the second inner panel 220 and a rear end 214out of the second outer panel 230. The front end 212 of the second side cushion 211 may be formed by overlapping and sewing a front end 212 in of the second inner panel 220 and a front end 212out of the second outer panel 230.

In order to prevent the second side cushion 211 from being damaged by heat and pressure of gas discharged when the second inflator 202 explodes due to a vehicle collision accident, an inflator mounting panel 226 may be attached to the rear end 214 in of the second inner panel 220, and an inflator mounting panel 236 may be attached to the rear end 214out of the second outer panel 230. The rear end 214 in of the second inner panel 220, the rear end 214out of the second outer panel 230, and the inflator mounting panels 226 and 236 may be sewn along a sewing line 242, and the second inflator 202 may be installed therein.

The second chamber 210 may include a pair of second side cushion internal tethers 250 and 255 disposed at (or provided in) the second side cushion 211 to limit a thickness of the second side cushion 211. The pair of second side cushion internal tethers 250 and 255 may include a front internal tether 250 and a rear internal tether 255 that is positioned to be spaced apart rearward from the front internal tether 250.

One end of the front internal tether 250 may be sewn along a sewing line 251 and coupled to the second inner panel 220. A remaining end of the front internal tether 250 may be sewn along a sewing line 252 and coupled to the second outer panel 230.

One end of the rear internal tether 255 may be sewn along a sewing line 256 and coupled to the second inner panel 220. A remaining end of the rear internal tether 255 may be sewn along a sewing line 257 and coupled to the second outer panel 230. A tether through-hole 278 that allows smooth flow of gas when the second side cushion 211 is deployed may be formed in the rear internal tether 255. Unlike the embodiment illustrated in FIGS. 2 and 7, an airbag apparatus according to another embodiment of the present disclosure may include a single internal tether or three or more internal tethers in the second side cushion.

The second bending portion 260 may include a second folded portion 261, a second through-hole 262, a second front bending reinforcement tether 270, and a second rear bending reinforcement tether 275. The second bending portion 260 may be located between the front end 212 and the rear end 214 of the second side cushion 211.

The second folded portion 261 is a portion where the second inner panel 220 is folded such that portions of the second inner panel 220 partially overlap each other. The second through-hole 262 may be formed to pass through the second inner panel 220. A planar shape of the second through-hole 262 may include, for example, a rugby ball shape in plan view or an elliptical shape, as illustrated in FIG. 7.

The second folded portion 261 may be formed by folding the second inner panel 220 such that the second through-hole 262 is closed, and sewing, along a sewing line 264, portions of the second inner panel 220 that face each other by the folding. As illustrated in FIG. 7, the sewing line 264 may be spaced apart from an inner peripheral edge of the second through-hole 262 at a constant interval and may extend along a closed-loop path.

Because a length of the second inner panel 220 becomes substantially shorter than a length of the second outer panel 230 due to the second folded portion 261, the second side cushion 211 may be bent at the second bending portion 260 toward the central portion between the left end and the right end of the seatback 20.

The second front bending reinforcement tether 270 may be located in front of the second folded portion 261, and the second rear bending reinforcement tether 275 may be located behind the second folded portion 261. The second front bending reinforcement tether 270 may include an inner end sewn and coupled to the second inner panel 220 along a sewing line 271, and an outer end sewn and coupled to the second outer panel 230 along a sewing line 272.

The second rear bending reinforcement tether 275 may include an inner end sewn and coupled to the second inner panel 220 along a sewing line 276, and an outer end sewn and coupled to the second outer panel 230 along a sewing line 277.

In a deployed state of the second chamber 210, a distance BD22 between the outer end of the second front bending reinforcement tether 270 and the outer end of the second rear bending reinforcement tether 275 may be greater than a distance BD21 between the inner end of the second front bending reinforcement tether 270 and the inner end of the second rear bending reinforcement tether 275.

The second front cushion 280 may include a second front cushion panel 281. The second front cushion panel 281 may include an outer sheet 282, an inner sheet 283, and an inner panel coupling portion 284 between the outer sheet 282 and the inner sheet 283.

The second front cushion panel 281 may be folded such that the outer sheet 282 and the inner sheet 283 face each other around the inner panel coupling portion 284, and thereafter, an outer peripheral portion of the second front cushion panel 281 may be sewn along an outer sewing line 286, thereby forming the second front cushion 280 that defines an internal space.

In order to allow gas supplied from the second inflator 202 to flow from the internal space of the second side cushion 211 into the internal space of the second front cushion 280, a front cushion connection through-hole 224 may be formed in the front end 212 in of the second inner panel 220, and a side cushion connection through-hole corresponding to the front cushion connection through-hole 224 may be formed in the inner panel coupling portion 284.

The inner panel coupling portion 284 may be coupled to the second inner panel 220 by sewing around the front cushion connection through-hole 224 and the side cushion connection through-hole along a sewing line 287.

The second chamber 210 may include a pair of second front cushion internal tethers 288 in the second front cushion 280 to limit a thickness of the second front cushion 280. In the same manner as the first side cushion internal tethers 250 and 255, each of the pair of second front cushion internal tethers 288 may have one end and a remaining end that are respectively coupled to the outer sheet 282 and the inner sheet 283 by sewing.

The pair of second front cushion internal tethers 288 may be spaced apart from each other in a longitudinal direction of the second front cushion 280. Unlike the embodiment illustrated in FIG. 2, an airbag apparatus according to another embodiment of the present disclosure may include a single internal tether or three or more internal tethers in the second front cushion.

Referring to FIGS. 2, 6, and 8, the airbag apparatus 100 may further include a front cushion coupling portion 300 configured to detachably couple the first front cushion 180 and the second front cushion 280 when the first front cushion 180 and the second front cushion 280 overlap.

For example, the front cushion coupling portion 300 may include a female Velcro tape 191 and a male Velcro tape 291. The female Velcro tape 191 may be securely mounted to a surface of the first front cushion 180, which faces the second front cushion 280, i.e., to a front surface of the first front cushion 180. The male Velcro tape 291 may be securely mounted to a surface of the second front cushion 280, which faces the first front cushion 180, i.e., to a rear surface of the second front cushion 280.

In more detail, the female Velcro tape 191 may be secured to an outer surface of the outer sheet 182 of the first front cushion panel 181. The male Velcro tape 291 may be secured to an outer surface of the inner sheet 283 of the second front cushion panel 281.

Unlike the embodiment illustrated in FIGS. 2, 6, and 8, in an airbag apparatus according to another embodiment of the present disclosure, a male Velcro tape may be securely coupled to the first front cushion, and a female Velcro tape may be securely coupled to the second front cushion.

According to the airbag apparatus 100 described above, the first side cushion 111 and the second side cushion 211 may be deployed and bent, such that the first side cushion 111 and the second side cushion 211 do not spread apart, and the first front cushion 180 and the second front cushion 280 may be reliably coupled by overlapping each other. Accordingly, in the event of a vehicle collision, the seated occupant on the seat 10 may be safely restrained, thereby preventing the seated occupant from being seriously injured.

In addition, even in the case of a seated occupant 1 having a relatively large distance between shoulders 5 and 7, because the first front cushion 180 and the second front cushion 280 may overlap and be coupled, serious injury to the seated occupant may be prevented in the event of a vehicle collision.

Although embodiments of the present disclosure have been described with reference to the accompanying drawings, these embodiments are provided for the illustrative purpose, and it will be apparent to those skilled in the art that various modifications and equivalent embodiments can be made from the embodiments disclosed herein. Therefore, the true technical scope of the disclosure should be defined by the following claims.

What is claimed is:

1. An airbag apparatus comprising a first chamber and a second chamber, wherein the first chamber comprises:

a first side cushion connected to a first side of a seatback of a seat of a vehicle and configured to be deployed forward when inflated, the first side cushion including a first bending portion configured to cover a first lateral side of an occupant space on the seat; and a first front cushion configured to be deployed from the first side cushion so that the first front cushion is disposed in front of the occupant space; and wherein the second chamber comprises:

a second side cushion connected to a second side of the seatback and configured to be deployed forward when inflated, the second side cushion including a second bending portion configured to cover a second lateral side of the occupant space; and a second front cushion configured to be deployed from the second side cushion so that the second front cushion overlaps the first front cushion, wherein the first side cushion includes a first outer panel and a first inner panel that overlaps the first outer panel to form a first internal space of the first side cushion together with the first outer panel, and wherein the first bending portion includes:

a first folded portion formed by folding the first inner panel such that a plurality of portions of the first inner panel partially overlap each other; and a first through-hole passing through the first inner panel, wherein the first folded portion is formed by folding the first inner panel such that the first through-hole is closed and sewing a plurality of portions of the first inner panel that face each other when the first inner panel is folded.

2. The airbag apparatus of claim 1, wherein:

the second side cushion includes a second outer panel and a second inner panel that overlaps the second outer panel and forms a second internal space of the second side cushion together with the second outer panel, and the second bending portion includes a second folded portion formed by folding the second inner panel such that a plurality of portions of the second inner panel partially overlap each other.

3. The airbag apparatus of claim 2, wherein:

the second bending portion further includes a second through-hole passing through the second inner panel, and the second folded portion is formed by folding the second inner panel such that the second through-hole is closed and sewing a plurality of portions of the second inner panel that face each other when the second inner panel is folded.

4. The airbag apparatus of claim 1, wherein the first bending portion further includes:

a first front bending reinforcement tether disposed in front of the first folded portion and including an inner end coupled to the first inner panel and an outer end coupled to the first outer panel; and a first rear bending reinforcement tether disposed behind the first folded portion and including an inner end coupled to the first inner panel and an outer end coupled to the first outer panel.

5. The airbag apparatus of claim 4, wherein a distance between the outer end of the first front bending reinforcement tether and the outer end of the first rear bending reinforcement tether is greater than that between the inner end of the first front bending reinforcement tether and the inner end of the first rear bending reinforcement tether.

6. The airbag apparatus of claim 2, wherein the second bending portion further includes:

a second front bending reinforcement tether disposed in front of the second folded portion and including an inner end coupled to the second inner panel and an outer end coupled to the second outer panel; and a second rear bending reinforcement tether disposed behind the second folded portion and including an inner end coupled to the second inner panel and an outer end coupled to the second outer panel.

7. The airbag apparatus of claim 6, wherein a distance between the outer end of the second front bending reinforcement tether and the outer end of the second rear bending reinforcement tether is greater than that between the inner end of the second front bending reinforcement tether and the inner end of the second rear bending reinforcement tether.

8. The airbag apparatus of claim 1, further comprising a front cushion coupling portion configured to detachably couple the first front cushion and the second front cushion when the first front cushion and the second front cushion overlap each other.

9. The airbag apparatus of claim 8, wherein the front cushion coupling portion comprises:

a female Velcro tape disposed on one of the first front cushion and the second front cushion, and a male Velcro tape disposed on the other of the first front cushion and the second front cushion and configured to face the female Velcro tape.

10. The airbag apparatus of claim 1, further comprising:

a first inflator disposed at the first side cushion and configured to provide gas that deploys the first chamber; and a second inflator disposed at the second side cushion and configured to provide gas that deploys the second chamber.

11. The airbag apparatus of claim 1, further comprising a first side tether including a first end coupled to the first side of the seatback and a second end coupled to the first side cushion.

12. The airbag apparatus of claim 11, further comprising a second side tether including a first end coupled to the second side of the seatback and a second end coupled to the second side cushion.

13. The airbag apparatus of claim 12, further comprising:

a first inflator disposed at the first side cushion and configured to provide gas that deploys the first chamber;

a first inflator fixing stud connecting the seatback and the first inflator such that the first inflator is supported on the first side of the seatback;

a second inflator disposed at the second side cushion and configured to provide gas that deploys the second chamber; and a second inflator fixing stud connecting the seatback and the second inflator such that the second inflator is supported on the second side of the seatback, wherein the first end of the first side tether is coupled to the first inflator fixing stud, and wherein the first end of the second side tether is coupled to the second inflator fixing stud.

14. The airbag apparatus of claim 1, wherein:

the first chamber includes at least one first side cushion internal tether disposed at the first side cushion and configured to limit a thickness of the first side cushion, and the second chamber includes at least one second side cushion internal tether disposed at the second side cushion and configured to limit a thickness of the second side cushion.

15. The airbag apparatus of claim 1, wherein:

the first chamber includes at least one first front cushion internal tether disposed at the first front cushion and configured to limit a thickness of the first front cushion, and the second chamber includes at least one second front cushion internal tether disposed at the second front cushion and configured to limit a thickness of the second front cushion.

* * * * *